US009826260B2

(12) United States Patent
Li et al.

(10) Patent No.: US 9,826,260 B2
(45) Date of Patent: Nov. 21, 2017

(54) VIDEO ENCODING DEVICE AND VIDEO ENCODING METHOD

(71) Applicant: Sercomm Corporation, Taipei (TW)

(72) Inventors: Si-Feng Li, Jiangsu Province (CN); Shao-Hai Zhao, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 14/860,815

(22) Filed: Sep. 22, 2015

(65) Prior Publication Data

US 2016/0119625 A1    Apr. 28, 2016

(30) Foreign Application Priority Data

Oct. 28, 2014    (CN) .......................... 2014 1 0589161

(51) Int. Cl.
*H04N 7/173*      (2011.01)
*H04N 21/2343*    (2011.01)
*H04N 21/238*     (2011.01)
*H04N 21/24*      (2011.01)

(52) U.S. Cl.
CPC ............. *H04N 21/234381* (2013.01); *H04N 21/23805* (2013.01); *H04N 21/2402* (2013.01)

(58) Field of Classification Search
CPC .......... H04N 21/2343; H04N 21/2365; H04N 21/24; H04N 21/238; H04N 21/234381; H04N 21/23655; H04N 21/2402; H04N 21/23805
USPC .................................... 725/98, 114, 116, 118
See application file for complete search history.

(56) References Cited

U.S. PATENT DOCUMENTS

| | | | | |
|---|---|---|---|---|
| 5,819,048 A | * | 10/1998 | Okazaki | H04N 17/004 348/412.1 |
| 2003/0103243 A1 | * | 6/2003 | Watanabe | H04N 21/2381 358/405 |
| 2003/0140159 A1 | * | 7/2003 | Campbell | H04L 29/06 709/231 |

(Continued)

FOREIGN PATENT DOCUMENTS

CN    101257628 A    9/2008
CN    101594529 A    12/2009

(Continued)

OTHER PUBLICATIONS

EP Search Report dated Mar. 4, 2016 in corresponding European application (No. 15190150.1-1902).

(Continued)

*Primary Examiner* — Nnenna Ekpo
(74) *Attorney, Agent, or Firm* — McClure, Qualey & Rodack, LLP

(57) ABSTRACT

A video encoding device is provided. The video encoding device includes an encoding unit, a transmission unit, and a calculating unit. The encoding unit generates an encoded video with an encoding frame rate. The transmission unit provides a video stream to a client terminal via network according to the encoded video. The calculating unit calculates an encoding rate in a first detection period according to the encoded video, and calculates a transmission rate in a second detection period according to the video stream. The encoding unit adjusts the encoding frame rate according to the encoding rate and the transmission rate.

8 Claims, 2 Drawing Sheets

(56) References Cited

U.S. PATENT DOCUMENTS

| | | | |
|---|---|---|---|
| 2006/0025149 A1 | 2/2006 | Karaoguz et al. | |
| 2006/0088094 A1* | 4/2006 | Cieplinski | H04N 21/23406 375/240.01 |
| 2007/0067480 A1* | 3/2007 | Beek | H04L 29/06027 709/231 |
| 2007/0296854 A1* | 12/2007 | Berkey | H04N 19/172 348/412.1 |
| 2009/0116563 A1* | 5/2009 | Kawamura | H04N 7/152 375/240.26 |
| 2009/0119736 A1* | 5/2009 | Perlman | A63F 13/12 725/133 |
| 2010/0158109 A1* | 6/2010 | Dahlby | H04N 7/17318 375/240.03 |
| 2011/0123170 A1 | 5/2011 | Kure | |
| 2011/0126255 A1* | 5/2011 | Perlman | A63F 13/12 725/116 |
| 2011/0268185 A1* | 11/2011 | Watanabe | H04N 21/2343 375/240.03 |
| 2012/0179833 A1* | 7/2012 | Kenrick | H04N 21/234309 709/231 |
| 2012/0195388 A1 | 8/2012 | Oike | |
| 2012/0210216 A1* | 8/2012 | Hurst | H04N 5/783 715/716 |
| 2013/0039177 A1 | 2/2013 | Ozawa | |
| 2013/0067524 A1* | 3/2013 | Andrews | H04N 21/234363 725/109 |
| 2013/0308919 A1* | 11/2013 | Shaw | H04N 21/2221 386/239 |
| 2015/0098020 A1* | 4/2015 | Vill | H04N 5/04 348/513 |
| 2016/0173805 A1* | 6/2016 | Claus | H04N 17/004 348/148 |

FOREIGN PATENT DOCUMENTS

| | | |
|---|---|---|
| CN | 101909060 A | 12/2010 |
| CN | 101909208 A | 12/2010 |
| CN | 102170554 A | 8/2011 |
| CN | 102497540 A | 6/2012 |
| CN | 102893658 A | 1/2013 |
| CN | 102905128 A | 1/2013 |
| CN | 103702119 A | 4/2014 |
| CN | 103716584 A | 4/2014 |
| CN | 103905708 A | 7/2014 |
| CN | 104580969 A | 4/2015 |
| CN | 104618690 A | 5/2015 |
| EP | 1638333 A1 | 3/2006 |
| WO | 2009073792 A1 | 6/2009 |

OTHER PUBLICATIONS

EP Office Action dated May 9, 2017 in European application (No. 15190150.1-1902).
Claypool, et al.: "On the performance of OnLive thin client games"; Multimedia Systems (2014); pp. 471-484.
CN Office Action dated Aug. 14, 2017 in corresponding Chinese application (No. 201410589161.9).

* cited by examiner

VIDEO ENCODING DEVICE AND VIDEO ENCODING METHOD

This application claims the benefit of People's Republic of China application Serial No. 201410589161.9, filed Oct. 28, 2014, the subject matter of which is incorporated herein by reference.

BACKGROUND

Field of the Invention

The disclosure relates in general to a video encoding device and method, and more particularly to a video encoding device and method adjusted dynamically according to session loading.

Related Art

As technology advances, video encoding techniques have been widely used in multimedia products. The encoded video is often transmitted via network. For example, an Internet Protocol (IP) camera captures video, encodes video, compresses data, and then transmits the encoded video via network in real time to a remote device. Another example is a video server. The video server encodes and compresses a video file in the database to provide a streaming media service to a client terminal via network.

For an application that requires real-time video playback, the transmitted video data may be affected by the unstable network transmission quality and/or the network congestion condition. In such cases the user would not be able to watch a smooth video stream in real time. Thus there is a need for providing smooth video streams in response to variable network conditions.

SUMMARY

The disclosure is directed to a video encoding device and a video encoding method. One of the advantages of the video encoding device is the ability to adjust the encoding frame rate of the encoding unit according to the network transmission quality, such that a smooth video stream can be provided to a client terminal.

According to one embodiment of the invention, a video encoding device is provided. The video encoding device includes an encoding unit, a transmission unit, and a calculating unit. The encoding unit generates an encoded video with an encoding frame rate. The transmission unit provides a video stream to a client terminal via network according to the encoded video. The calculating unit calculates an encoding rate in a first detection period according to the encoded video, and calculates a transmission rate in a second detection period according to the video stream. The encoding unit adjusts the encoding frame rate according to the encoding rate and the transmission rate.

According to another embodiment of the invention, a video encoding method is provided. The video encoding method includes the following steps: generating an encoded video with an encoding frame rate; providing a video stream via network according to the encoded video; calculating an encoding rate in a first detection period according to the encoded video; calculating a transmission rate in a second detection period according to the video stream; and adjusting the encoding frame rate according to the encoding rate and the transmission rate.

The invention will become apparent from the following detailed description of the preferred but non-limiting embodiments. The following description is made with reference to the accompanying drawings.

Figure 1:
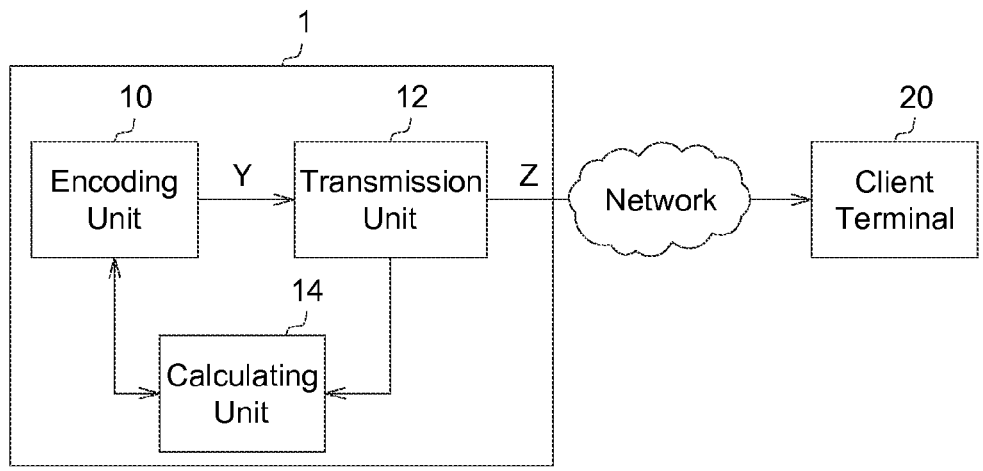
FIG. 1 shows a block diagram of a video encoding device according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A streaming media server may be an IP camera or a video server. A client terminal may be a user's cell phone, a desktop/laptop computer, or other personal electronic devices. When the client terminal establishes a session to the server to request a video stream, the server transmits a video stream to the client terminal in response. If the network transmission quality is somewhat poor (for example, due to degraded received wireless network signal quality in the client terminal, or network congestion resulting from the increasing number of users in the network), the video data encoded in the server may not be transmitted in time because of the reduced network bandwidth. In this case there will be excess image frames accumulated in the server. These frames have to be discarded in order to provide a real time video stream, and hence the video provided to the user becomes discontinuous. In particular, encoding by motion vectors is common in video encoding techniques, which means the encoding process involves motion estimation and motion compensation depending on previous frames and following frames. Therefore when discarding image frames, multiple frames have to be discarded so that the decoder can successfully decode, which results in severe discontinuity in the video stream.

For example, the streaming media server encodes the video with the encoding frame rate of 30 frames per second (fps). However, the current network transmission quality only allows a network bandwidth with 20 frames per second to be transmitted to the client terminal. 10 frames have to be discarded every second. Because too many frames are lost in this process, the user may feel unsatisfied when watching this video stream.

To overcome the aforementioned problem, a video encoding device and method capable of adjusting the encoding frame rate dynamically according to the session loading is provided in this disclosure.

FIG. 1 shows a block diagram of a video encoding device according to one embodiment of the invention. The video encoding device 1 includes an encoding unit 10, a transmission unit 12, and a calculating unit 14. The encoding unit 10 generates an encoded video Y with an encoding frame rate RFPS. The transmission unit 12 provides a video stream Z to a client terminal 20 via network according to the encoded video Y. The calculating unit 14 calculates an encoding rate EBPS in a first detection period To1 according to the encoded video Y, and calculates a transmission rate NBPS in a second detection period To2 according to the video stream Z. The encoding unit 10 adjusts the encoding frame rate RFPS according to the encoding rate EBPS and the transmission rate NBPS.

The encoding rate EBPS and transmission rate NBPS may be calculated by dividing the data amount by time, for example, the encoding rate EBPS and transmission rate NBPS may be in the unit of bits per second (bit rate). The first detection period To1 is preferably to be overlapped with the second detection period To2 as much as possible. Theoretically a better result can be achieved when the first detection period To1 coincides with the second detection period To2.

The encoding unit 10 encodes a source video (not illustrated in FIG. 1). The source video may be raw video data captured by an IP camera, or multimedia data in a database of a video server. The encoding unit 10 may set the encoding frame rate RFPS, that is, to determine how many frames per second in the encoded video. Then the encoding unit 10 generates the encoded video Y with the encoding frame rate RFPS. The encoding process may include data compression. The encoded video Y may be in MPEG-2, MPEG-4, H.264, H.265, or other available video formats.

In the initial state when the client terminal 20 just established a session requesting a video stream, the encoding frame rate RFPS is initially set as a target frame rate TFPS. The target frame rate TFPS may be a predetermined configuration parameter, or may be specified in the session request originated from the client. The target frame rate TFPS may represent a target value that provides an ideal video stream quality. The target frame rate may be for example 30 fps or 60 fps depending on the demands and the environment.

The transmission unit 12 may be a network interface unit, responsible for the data transmission and data control in the network, particularly focusing in the transport layer related tasks for example. The transmission unit 12 provides a video stream Z via network to the client terminal 20 according to the encoded video Y. The video stream Z depends on the current network transmission quality. The transmission unit 12 may determine the transmission rate of the video stream Z according to the waiting period of the acknowledged (ACK) signal from the client terminal 20 and/or the network flow control.

The calculating unit 14 calculates the encoding rate EBPS in the first detection period To1 according to the encoded video Y. The first detection period To1 is for example 1 second, that is, the encoding rate EBPS is updated every second. The encoding rate EBPS represents the image quality of the encoded video Y. A higher encoding rate EBPS may represent a higher image resolution, a higher image frame rate, and/or a lower amount of distortion during the compression process. The encoding rate EBPS is determined according to the encoded video Y rather than according to the video stream Z transmitted by the transmission unit 12. The encoding rate EBPS may be in the unit of bits per second. For example, an IP camera may have an encoding rate EBPS equal to one million bits per second (1 Mbps).

In addition, the calculating unit 14 calculates the transmission rate NBPS in the second detection period To2 according to the video stream Z. The second detection period To2 is for example 1 second. The transmission rate NBPS represents the current network transmission quality. A higher transmission rate NBPS may represent a higher network connection bandwidth, and/or a lower number of users in the network. The range of the transmission rate NBPS may vary greatly for different network transmission interfaces, such as Wi-Fi, 3G/4G mobile communication, and wired network. The transmission rate NBPS may also be in the unit of bits per second.

The encoding unit 10 adjusts the encoding frame rate RFPS (unit: fps) according to the encoding rate EBPS and the transmission rate NBPS obtained from the calculating unit 14. In other words, the encoding unit 10 considers the current session loading to adjust the encoding frame rate RFPS during the encoding process, and thus changes the frame rate of the encoded video Y.

The video encoding device 1 disclosed in the above embodiment calculates the encoding rate EBPS and the transmission rate NBPS, and thus is able to examine the relative relationship between the encoded video Y generated by the encoding unit 10 and the video stream Z generated by the transmission unit 12. The video encoding device 1 then knows whether or not the network is congested and can adjust the encoding frame rate RFPS accordingly. The encoding process performed in the encoding unit 10 is adjusted such that the frame rate of the encoded video Y can better fit the current network transmission bandwidth.

For example, when congestion occurs, the transmission rate NBPS decreases, the data amount per second outputted from the encoding unit 10 (the encoding rate EBPS) is greater than the data amount per second that can be transmitted by the transmission unit 12 (the transmission rate NBPS). In this case, the calculating unit 14 may inform the encoding unit 10 to decrease the encoding frame rate RFPS to reduce the data amount per second outputted from the encoding unit 10, so as to better fit the transmission rate NBPS. By adjusting the encoding frame rate RFPS dynamically, the transmission unit 12 does not have to discard excess image frames and hence the user can watch a smooth video stream.

The encoding unit 10, the transmission unit 12, and the calculating unit 14 may be implemented by software, hardware, or software hardware integration. A software implementation may be a specific program stored in a non-transitory computer readable medium. A processor may load the program code to execute the program. A hardware implementation may be digital signal processors with specific functions. The encoding unit 10, the transmission unit 12, and the calculating unit 14 may each be implemented by an application specific circuit, in order to meet the high efficiency and low power requirement.

Figure 2:
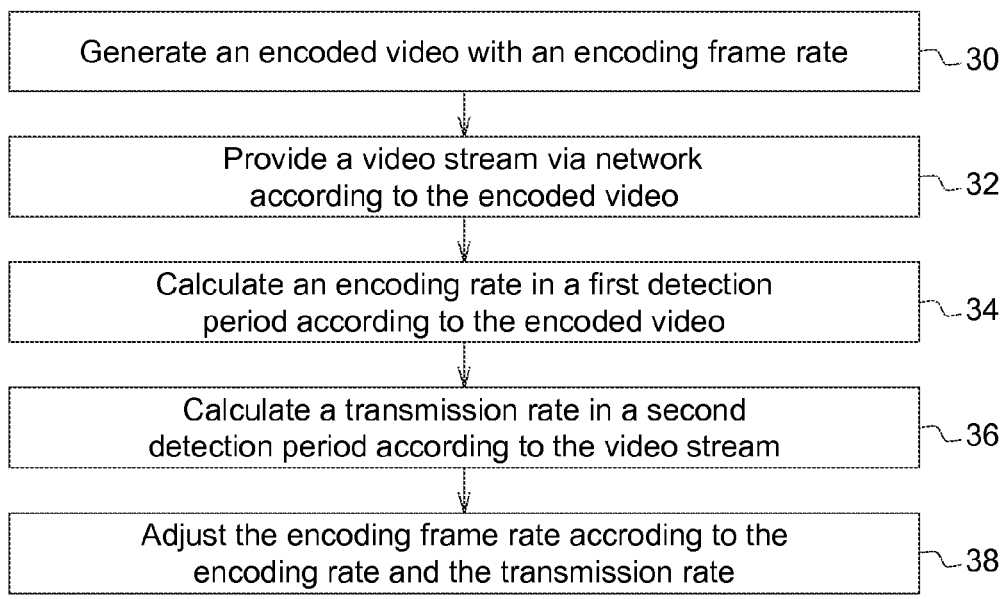
FIG. 2 shows a flowchart of a video encoding method according to one embodiment of the invention.

FIG. 2 shows a flowchart of a video encoding method according to one embodiment of the invention. The video encoding method includes the following steps. Step 30: generate an encoded video Y with an encoding frame rate RFPS. The encoding process may be performed by an encoding circuit. The encoding frame rate RFPS may be initially set as a target frame rate TFPS. Step 32: provide a video stream Z via network according to the encoded video Y. For example, a network interface circuit transmits a video stream Z to a remote device. Step 34: calculate an encoding rate EBPS in a first detection period To1 according to the encoded video Y. The first detection period To1 may be 1 second. Step 36: calculate a transmission rate NBPS in a second detection period To2 according to the video stream Z. The second detection period To2 may be 1 second. Step 38: adjust the encoding frame rate RFPS according to the encoding rate EBPS and the transmission rate NBPS. The steps shown in FIG. 2 may be performed iteratively in a session. In other words, as long as the session does not end, step 38 may go back to step 30 to run the procedure again.

Also the first detection period To1 and/or the second detection period To2 may be changed to a different value.

Figure 3:
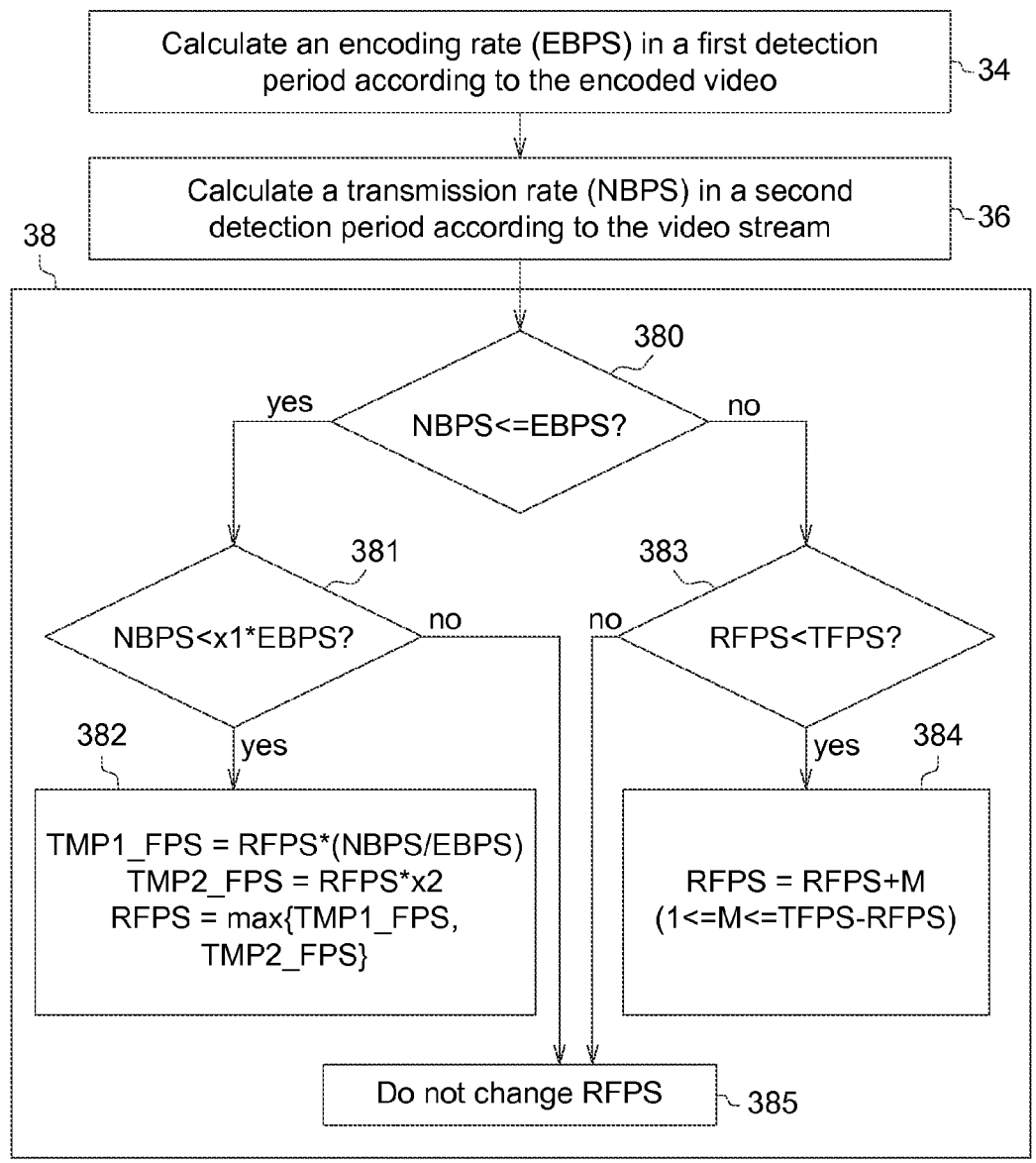
FIG. 3 shows a flowchart of the steps of adjusting the encoding frame rate in the video encoding method according to one embodiment of the invention.

The detailed steps of adjusting the encoding frame rate RFPS are exemplified below with reference to FIG. 3. FIG. 3 shows a flowchart of the steps of adjusting the encoding frame rate RFPS in the video encoding method according to one embodiment of the invention.

In step 380, determine whether or not the transmission rate NBPS is less than or equal to the encoding rate EBPS. If yes, the current network bandwidth is not sufficient to support the transmission of the current encoded video. The encoding frame rate RFPS may have to be reduced. Still further determination steps have to be made.

In step 381, a ratio R of the transmission rate NBPS to the encoding rate EBPS is calculated (R=NBPS/EBPS). The ratio R is a real number ranging from 0 to 1. The encoding frame rate RFPS may be adjusted according to the ratio R. Refer to the video encoding device 1 shown in FIG. 1, the encoding unit 10 adjusts the encoding frame rate RFPS according to the ratio R.

When the ratio R is greater than or equal to a first reference coefficient x1 (the "no" branch of step 381), the encoding frame rate RFPS remains unchanged (step 385). For example, the first reference coefficient x1 is 0.9. When the transmission rate NBPS is greater than or equal to 0.9 times the encoding rate EBPS, the current network bandwidth may still be sufficient to handle the data transmission. The transmission rate NBPS is just slightly less than the encoding rate EBPS, which may be caused by temporary unstable network condition. The encoding frame rate RFPS remains unchanged in this scenario to avoid changing the encoding frame rate RFPS too frequently. x1=0.9 in the above description is merely an example. The first reference coefficient x1 may be set based on the usage requirements.

When the ratio R is less than the first reference coefficient x1 (the "yes" branch of step 381), the network bandwidth is too low. The encoding frame rate RFPS has to be reduced. The detailed adjustment steps are shown in step 382. The first temporary value TMP1_FPS is set as the current encoding frame rate RFPS multiplied by the ratio R (R=NBPS/EBPS). The second temporary value TMP2_FPS is set as the current encoding frame rate RFPS multiplied by the second reference coefficient x2. Then, the encoding frame rate RFPS is set as the maximum of the first temporary value TMP1_FPS and the second temporary value TMP2_FPS.

In other words, when the ratio R is greater than or equal to the first reference coefficient x1, do not change the encoding frame rate RFPS. When the ratio R is less than the first reference coefficient x1 and greater than or equal to the second reference coefficient x2, the encoding frame rate RFPS is multiplied by the ratio R. When the ratio R is less than the second reference coefficient x2, the encoding frame rate RFPS is multiplied by the second reference coefficient x2.

The second reference coefficient x2 is for example 0.5. The step 382 represents that the encoding frame rate RFPS is reduced to R times the original encoding frame rate RFPS. But if the ratio R is less than 0.5, then the encoding frame rate RFPS is reduced to 0.5 times the original encoding frame rate RFPS. The purpose of reducing the encoding frame rate RFPS to R times the original encoding frame rate RFPS is to make the encoding rate EBPS fit the transmission rate NBPS under current network condition. If the ratio R is too small, then the maximum allowed reduction factor is 0.5 times the original value, so as to prevent a huge value drop in the encoding frame rate RFPS.

Next, refer to the "no" branch of step 380. When the transmission rate NBPS is greater than the encoding rate EBPS, the current network condition is able to support the transmission of the encoded video and may still have available bandwidth. There is a chance to increase the encoding frame rate RFPS, further determination steps are needed.

In step 383, determine whether or not the encoding frame rate RFPS is less than the target frame rate TFPS. The encoding frame rate RFPS is adjusted according to the relationship between the encoding frame rate RFPS and the target frame rate TFPS. Refer to the video encoding device 1 shown in FIG. 1, the encoding unit 10 adjusts the encoding frame rate RFPS according to the relationship between the encoding frame rate RFPS and the target frame rate TFPS.

When the encoding frame rate RFPS is less than the target frame rate TFPS (the "yes" branch of step 383, probably there is still available bandwidth), the encoding frame rate RFPS may be incremented by a step value M (step 384). The step value M is greater than or equal to 1 and less than or equal to the difference between the target frame rate TFPS and the encoding frame rate RFPS. That is, the maximum value of the incremented encoding frame rate RFPS is equal to the target frame rate TFPS. The step value M is for example equal to 1, the encoding frame rate RFPS increases 1 every time step 384 is executed. The encoding frame rate RFPS increases gradually such that there will be no huge value jump in the encoding frame rate RFPS. Also, the gradual increment avoids the case that a sudden huge increase in the encoding frame rate RFPS makes the network bandwidth insufficient to support the encoded video.

When the encoding frame rate RFPS is equal to the target frame rate TFPS (the "no" branch of step 383), the encoding frame rate RFPS remains unchanged since the target value has been reached.

As described above, the encoding frame rate RFPS is set as the target frame rate TFPS in the initial state. The left-hand side of the flowchart shown in FIG. 3 (the "yes" branch of step 380) corresponds to the decrease of the encoding frame rate RFPS. The right-hand side of the flowchart shown in FIG. 3 (the "no" branch of step 380) corresponds to the increase of the encoding frame rate RFPS. The maximum possible value of the encoding frame rate RFPS is equal to the target frame rate TFPS in this flow (the "no" branch of step 383 represents that the encoding frame rate RFPS is equal to the target frame rate TFPS).

In the above embodiment, the first detection period To1 is 1 second, the second detection period is 1 second, the first reference coefficient x1 is 0.9, the second reference coefficient x2 is 0.5, and the step value M is 1. The parameter values are not limited thereto and can be set arbitrarily depending on the design requirements.

The video encoding method disclosed in the present embodiment adjusts the encoding frame rate according to the network condition of the video session to provide a smooth video stream. It is especially useful in real-time applications, such as video conferencing or real-time monitoring IP cameras. The proposed video encoding method can make the server adjust the encoding frame rate adaptively in response to the network condition, such that the server does not have to discard too many image frames and hence can maintain smooth real-time video streams.

Furthermore, when the encoding frame rate has to be decreased, the accurate relative relationship between the encoding rate and the transmission rate is taken into consideration, such that the reduced encoding frame rate can meet the current network condition quickly. The condition regarding whether to reduce the encoding frame rate and the range of reduction have appropriate threshold values to avoid frequent modifications on the encoding frame rate (the encoding frame rate will not be affected when there is only a small disturbance in the network transmission quality). Also the reduction factor is limited by a maximum allowed value, such that a huge value drop in the encoding frame rate is avoided (because a sudden drop in transmission rate may be only temporary, the reduction factor is capped at a predetermined range).

On the other hand, the encoding frame rate can be increased when circumstances permit (for example, when the network becomes less congested). The video encoding method can detect when to increase the encoding frame rate. The encoding frame rate is gradually incremented by a predetermined step value (for example, 1). In summary, the encoding frame rate is "decreased by multiplication, increased by addition". Therefore the video encoding device can quickly adapt to different network environments to provide video streams with good quality, and frequent modifications on the encoding frame rate can also be avoided.

Also note that the video encoding device proposed herein depends on information obtained in the device itself. In other words, the video encoding device does not rely on any feedback from the client. Thus the operation can be made simple and cost effective. It also does not require any change on the client side. There is no need for the client (for example, user equipment) to install any particular application software, nor does the client hardware need to be modified.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video encoding device, comprising:
   at least one processor containing a plurality of units, including:
      an encoding unit, configured to generate an encoded video with an encoding frame rate;
      a transmission unit, configured to provide a video stream to a client terminal via network according to the encoded video; and
      a calculating unit, configured to calculate an encoding rate in a first detection period according to the encoded video, and calculate a transmission rate in a second detection period according to the video stream;
   wherein the plurality of units are operated under the control of the at least one processor,
   wherein the encoding unit is configured to adjust the encoding frame rate according to the encoding rate and the transmission rate;
   wherein the encoding unit is configured to decrease the encoding frame rate by multiplication when the transmission rate is less than the encoding rate, and the encoding unit is configured to increase the encoding frame rate by addition when the transmission rate is greater than or equal to the encoding rate,
   wherein when the transmission rate is greater than or equal to the encoding rate, the encoding frame rate is incremented gradually by a step value, and the step value is less than or equal to the difference between a target frame rate and the encoding frame rate.

2. The video encoding device according to claim 1, wherein the encoding unit is configured to adjust the encoding frame rate according to a ratio of the transmission rate to the encoding rate when the transmission rate is less than the encoding rate.

3. The video encoding device according to claim 2, wherein the encoding frame rate remains unchanged when the ratio is greater than or equal to a first reference coefficient, the encoding frame rate is multiplied by the ratio when the ratio is less than the first reference coefficient and greater than or equal to a second reference coefficient, and the encoding frame rate is multiplied by the second reference coefficient when the ratio is less than the second reference coefficient, wherein the encoding unit is configured to adjust the encoding frame rate according to a relationship between the encoding frame rate and the target frame rate when the transmission rate is greater than or equal to the encoding rate, wherein the encoding frame rate remains unchanged when the encoding frame rate is equal to the target frame rate, and the encoding frame rate is incremented by the step value gradually when the encoding frame rate is less than the target frame rate.

4. A video encoding method, comprising:
   generating an encoded video with an encoding frame rate;
   providing a video stream via network according to the encoded video;
   calculating an encoding rate in a first detection period according to the encoded video;
   calculating a transmission rate in a second detection period according to the video stream; and
   adjusting the encoding frame rate according to the encoding rate and the transmission rate;
   wherein the encoding frame rate is decreased by multiplication when the transmission rate is less than the encoding rate, and the encoding frame rate is increased by addition when the transmission rate is greater than or equal to the encoding rate,
   wherein when the transmission rate is greater than or equal to the encoding rate, the encoding frame rate is incremented gradually by a step value, and the step value is less than or equal to the difference between a target frame rate and the encoding frame rate.

5. The video encoding method according to claim 4, wherein the encoding frame rate is adjusted according to a ratio of the transmission rate to the encoding rate when the transmission rate is less than the encoding rate.

6. The video encoding method according to claim 5, wherein the encoding frame rate remains unchanged when the ratio is greater than or equal to a first reference coefficient, the encoding frame rate is multiplied by the ratio when the ratio is less than the first reference coefficient and greater than or equal to a second reference coefficient, and the encoding frame rate is multiplied by the second reference coefficient when the ratio is less than the second reference coefficient;
   wherein the step of adjusting the encoding frame rate comprises:
   adjusting the encoding frame rate according to a relationship between the encoding frame rate and the target frame rate when the transmission rate is greater than or equal to the encoding rate,
   wherein the encoding frame rate remains unchanged when the encoding frame rate is equal to the target frame rate, and the encoding frame rate is incremented by the step value gradually when the encoding frame rate is less than the target frame rate.

7. The video encoding device according to claim 1, wherein the step value is equal to 1.

8. The video encoding method according to claim 4, wherein the step value is equal to 1.

\* \* \* \* \*